United States Patent
Apostolo et al.

(10) Patent No.: US 6,555,639 B2
(45) Date of Patent: Apr. 29, 2003

(54) POLYMERIZATION PROCESS OF SULPHONIC MONOMERS

(75) Inventors: Marco Apostolo, Novara (IT); Vincenzo Arcella, Milan (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/886,106

(22) Filed: Jun. 22, 2001

(65) Prior Publication Data

US 2002/0013439 A1 Jan. 31, 2002

(30) Foreign Application Priority Data

Jun. 23, 2000 (IT) .......................... MI00A1417

(51) Int. Cl.[7] .......................... C08F 2/24; C08F 214/26; C08F 214/18
(52) U.S. Cl. ................. 526/206; 526/209; 526/243; 526/246; 526/247; 526/250
(58) Field of Search ................. 526/243, 246, 526/250, 206, 209, 247

(56) References Cited

U.S. PATENT DOCUMENTS

| | | |
|---|---|---|
| 4,035,565 A | 7/1977 | Apotheker et al. |
| 4,243,770 A | 1/1981 | Tatemoto et al. |
| 4,564,662 A | 1/1986 | Albin |
| 4,694,045 A | 9/1987 | Moore |
| 4,745,165 A | 5/1988 | Arcella et al. |
| 4,864,006 A | 9/1989 | Giannetti et al. |
| 4,943,622 A | 7/1990 | Naraki et al. |
| 4,990,283 A | 2/1991 | Visca et al. |
| 5,173,553 A | 12/1992 | Albano et al. |
| 5,608,022 A | * 3/1997 | Nakayama ................. 526/212 |
| 6,160,030 A | * 12/2000 | Chaouk ..................... 521/145 |

FOREIGN PATENT DOCUMENTS

EP    0 199 138 A2    10/1986

* cited by examiner

Primary Examiner—Fred Zitomer
(74) Attorney, Agent, or Firm—Arent Fox Kinter Plotkin & Kahn PLLC

(57) ABSTRACT

A polymerization process in microemulsion of:
(I) one or more fluorinated monomers containing at least one ethylene unsaturation;
(II) one or more fluorinated monomers containing sulphonyl groups —$SO_2F$; said process comprising:
  a) preparation of an aqueous microemulsion, having a pH in the range 4–7, of perfluoropolyethers (PFPEs);
  b) feeding of the microemulsion to the polymerization reactor, in an amount higher than 18 ml per liter of reaction medium;
  c) introduction of the monomer (II) in liquid form into the reactor, reactor pressurization with the gaseous monomers (I);
  d) addition of the initiator, and feeding of the monomers (I) during the polymerization so as to maintain constant the reactor pressure.

9 Claims, No Drawings

POLYMERIZATION PROCESS OF SULPHONIC MONOMERS

The invention relates to a polymerization process for obtaining sulphonic fluorinated ionomers with high productivity.

Specifcally, the invention relates to a polymerization process in microemulsion for obtaining sulphonic fluorinated ionomers, said process characterized by high productivity and by operating conditions such to minimize the coagulum formation during the polymerization and the reactor corrosion.

The polymerization of fluorinated monomers in microemulsion is known in the prior art. It shows a series of advantages with respect to the conventional polymerization in emulsion. Generally higher polymerization yields are obtained.

In U.S. Pat. No. 4,864,006 it is described that the microemulsion can be diluted when it is introduced into the reaction medium, allowing to control the polymer particle nucleation and to determine the number thereof. In said patent sulphonic fluorinated monomers are not mentioned among those polymerized in microemulsion. Tests carried out by the Applicant (see the Examples) have shown that, in the case of polymerization of sulphonic fluorinated monomers, by operating under the conditions indicated in said patent, an increase of the productivity of the polymerization process is not obtained with respect to the case of emulsion polymerization. Besides, there are problems of reactor corrosion and stability of the obtained latex and coagulum formation during the polymerization. The coagulum formation, in the case of an industrial reactor, requires frequent stops of the reactor for the cleaning. Therefore in a continuous or semi-continuous process the productivity is furtherly reduced. This drawback due to the formation of coagulum, besides taking place under the operating conditions described in U.S. Pat. No. 4,864,006, takes place also in the case of emulsion polymerization of sulphonic fluorinated monomers.

The need was therefore felt to have available a polymerization process for obtaining sulphonic fluorinated ionomers, said process characterized by high productivity, absence of coagulum formation during the polymerization and by minimization of the reactor corrosion.

An object of the invention is a polymerization process in microemulsion of:

(I) one or more fluorinated monomers containing at least one ethylene unsaturation;

(II) one or more florinated monomers containing sulphonyl groups —$SO_2F$; said process comprising:

a) preparation of an aqueous microemulsion, having a pH in the range 4–7, of perfluoropolyethers (PFPEs) having non reactive end groups or end groups optionally containing 1 or more H, Cl atoms instead of fluorine;

b) feeding of the microemulsion into the polymerization reactor, in an amount higher than 18 ml per liter of reaction medium, preferably 25–50 ml per liter of reaction medium;

c) reactor degassing, introduction of the monomer (II) in liquid form into the reactor, reactor pressurization with the gaseous monomers (I), optional addition of surfactants, stabilizers, chain transfer agents;

d) addition of the initiator, and during the polymerization feeding of the monomers (I) so as to maintain constant the reactor pressure and optionally further addition of the monomer (II) and of the chain transfer agents.

The latex discharged from the reactor can be subjected, if desired, to the usual post-treatments in connection with the considered uses, in particular to the coagulation and drying process.

The fluorinated monomers of type (I) are selected from:

vinylidene fluoride (VDF);

$C_2$–$C_8$ perfluoroolefins, preferably tetrafluoroethylene (TFE);

$C_2$–$C_8$ chloro- and/or bromo- and/or iodo-fluoroolefins, such as chlorotrifluoroethylene (CTFE) and bromotrifluoroethylene;

$CF_2$=$CFOR_f$ (per)fluoroalkylvinylethers (PAVE), wherein $R_f$ is a $C_1$–$C_6$ (per)fluoroalkyl, for example trifluoromethyl. bromodifluoromethyl, pentafluoropropyl;

$CF_2$=CFOX perfluoro-oxyalkylvinylethers, wherein X is a $C_1$–$C_{12}$ perfluoro-oxyalkyl having one or more ether groups, for example perfluoro-2-propoxy-propyl.

The fluorinated monomers of type (II) are selected from:

$F_2C$=CF—O—$CF_2$—$CF_2$—$SO_2F$ (vinylsulphonylfluoride);

$F_2C$=CF—O—[$CF_2$—CXF—O]$_n$—$CF_2$—$CF_2$—$SO_2F$ wherein X=Cl, F or $CF_3$; n=1–10;

$F_2C$=CF—O—$CF_2$—$CF_2$—$CF_2$—$SO_2F$;

$F_2C$=CF—Ar—$SO_2F$.

Optionally in the polymerization process of the invention, besides the monomers of type (I) and (II), bis-olefins of formula:

$$R_1R_2C=CH-(CF_2)_m-CH=CR_5R_6 \qquad (III)$$

wherein m=2–10, preferably 4–8, $R_1$, $R_2$, $R_5$, $R_6$, equal to or different from each other, are H or alkyl groups $C_1$–$C_5$, can be used as comonomers, in an amount in the range 0.01%–5% by moles.

Optionally in the polymerization process of the invention brominated and/or iodinated cure-site comonomers can be fed, such bromo and/or iodo olefins having from 2 to 10 carbon atoms (as described for example in U.S. Pat. No. 4,035,565 and U.S. Pat. No. 4,694,045), or iodo and/or bromo fluoroalkylvinylethers (as described in U.S. Pat. No. 4,745,165, U.S. Pat. No. 4,564,662 and EP-199,138), in such amounts wherefore the content of cure-site comonomers in the final product is generally in the range 0.05–2 moles per 100 moles of the other basis monomeric units.

Alternatively or also in combination with the cure-site comonomers, it is possible to introduce in the end groups iodine and/or bromine atoms by addition to the reaction mixture of iodinated and/or brominated chain transfer agents, such for example the compounds of formula $R_f(I)_x(Br)_y$, wherein $R_f$ is a (per)fluoroalkyl or a (per)fluorochloroalkyl having from 1 to 8 carbon atoms, while x and y are integers in the range 0–2, with $1 \leq x+y \leq 2$ (see for example U.S. Pat. No. 4,243,770 and U.S. Pat. No. 4,943, 622). It is also possible to use as chain transfer agents iodides and/or bromides of alkaline or alkaline-earth metals, according to U.S. Pat. No. 5,173,553. Other usable chain transfer agents are compounds hydrogen containing, such as hydrocarbons, alcohols, in particular ethyl acetate and ethane.

The polymerization initiators used in the process of the present invention are preferably radical inorganic initiators, such for example ammonium and/or potassium and/or sodium persulphate, optionally in combination with ferrous, cuprous or silver salts. The initiator feeding procedures can be in a continuous way or with a single addition at the polymerization starting.

Preferably in the polymerization process of the present invention:

TFE;

$CF_2=CF-O-CF_2CF_2SO_2F$;

bis-olefin of formula (III), wherein $R_1$, $R_2$, $R_5/R_6$ are H and m=6 or 8 are used as comonomers.

The microemulsions used in the process of the present invention are described in U.S. Pat. No. 4,864,006 and U.S. Pat. No. 4,990,283, herein incorporated by reference, wherein instead of the mentioned perfluoropolyethers having non reactive end groups, also hydrofluoropolyethers having one or both end groups containing one H atom, or having one or more chlorine atoms instead of fluorine in the chain end groups, can be used. The surfactants which can be used both for preparing the microemulsion and during the polymerization, are those described in the mentioned patents or those having an end group wherein one or more fluorine atoms are substituted by chlorine and/or hydrogen. The molecular weight of the perfluoropolyethers (PFPEs) which can be used can be lower also than 500, for example also 300 than as number average molecular weight.

The microemulsions used in the present invention have a pH in the range 4–7, obtained by suitably dosing the base to neutralize the surfactant agent. It has been in fact observed, see the Examples, that the use of a microemulsion having a pH in the range 4–7 minimizes the corrosion phenomena of the reactor.

The Applicant has surprisingly found that the necessary microemulsion amount to have the advantages of the present invention in terms of productivity and absence of coagulum formation, must be higher than 18 ml per liter of reaction medium, as shown in the Examples. Such amount is clearly higher than the upper limit indicated by the prior art (U.S. Pat. No. 4,864,006 and U.S. Pat. No. 4,990,283). By using the microemulsion in the amounts indicated in the prior art, no advantage is obtained in terms of productivity and absence of the coagulum formation with respect the emulsion polymerization.

With the polymerization process of the invention it is possible to obtain sulphonic fluorinated ionomers having a high molecular weight and a good chemical and thermal stability. However, it is always possible to lower the molecular weight by using suitable chain transfer agents as above indicated.

With the polymerization process of the invention it is furthermore possible to obtain sulphonic fluorinated ionomers having both high and low equivalent weight, in particular in the range 380–1,300.

The polymerization reaction is generally carried out at temperatures in the range 25°–120° C., under pressure, for example up to 3 MPa.

Preferably the polymerization process of the invention is carried out by using a microemulsion comprising:

a (per)fluoropolyether oil phase of formula:

wherein n/m=20 having average molecular weight in the range 400–600, a fluorinated surfactant of formula:

wherein R'=Na, K, NH$_4$, n/m=10 having average molecular weight in the range 500–700.

In the microemulsion containing as essential elements the (per)fluoropolyether oil phase, the fluorinated surfactant agent, water, and optionally co-surfactants as alcohols, small amounts of other compounds, such as for example chain transfer agents, initiators, functionalized comonomers, amorphous polymers such as for example homopolymers of perfluorodioxoles or copolymers of perfluorodioxoles with TFE, perfluorocarbons, etc., can be dissolved in the fluorinated oil phase.

Among the fluorinated surfactant agents suitable for obtaining the microemulsions of the present invention, anionic fluorinated surfactants agents, for example salts of fluorinated carboxylic acids or of sulphonic acids, having a perfluoro-polyether or perfluorocarbon structure or partially fluorinated, cationic surfactant agents, for example quaternary ammonium fluorinated salts, or still fluorinated non ionic surfactants agents, can be mentioned. The above surfactants can be also used in admixtures.

The sulphonic fluorinated ionomers obtained by the invention process are suitable to be used in the preparation of membranes for fuel cells, of membranes for electrochemical applications, such as for example chlorosoda cells, lithium batteries, and electrodialysis, and in reactors in which the ionomeric membrane has the function of superacid catalyst.

The following Examples are mentioned for illustrative, but not limitative purposes of the scope of the invention.

EXAMPLES

Example 1

In a 2 liter autoclave, the following reactants are introduced:

29 g of a microemulsion of perfluoropolyoxyalkylenes previously obtained by mixing:

11.6 g of a perfluoropolyoxyalkylene having one end group as a potassium salified acid of formula:

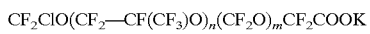

wherein n/m=10 having average molecular weight 527;

5.8 g of a perfluoropolyether oil Galden® D02 of formula:

wherein n/m=20 having average molecular weight 450;

11.6 g of water;

700 ml of demineralized water;

45 ml of the monomer of formula $CF_2=CF-O-CF_2CF_2-SO_2F$.

The autoclave, stirred at 700 rpm, has been heated up to 50° C. 400 ml of an aqeuous solution having a concentration of 20 g/l of potassium persulphate (KPS) are then fed into the autoclave. The pressure is brought up to 3 absolute atm by introducing TFE. The reaction starts after 1 min. The pressure is maintained at 3 absolute atm by feeding TFE. During the polymerization, 7.5 ml of the sulphonyl monomer of formula $CF_2=CF-O-CF_2CF_2-SO_2F$ are added every 6.5 g of fed TFE. The total mass of fed TFE into the reactor is equal to 122 g. The reaction is stopped after 302 min from the start, by slowing down the stirring, cooling the reactor and venting the TFE. The produced latex has a solid content of 28% by weight.

The copolymer composition determined by NMR results to be 68.4% molar of TFE and 31.6% molar of sulphonic monomer, corresponding to an equivalent weight of 496 g/eq. The productivity is equal to 76 g of obtained polymer per hour of polymerization.

Example 2

In a 2 liter autoclave, the following reactants are introduced:

38 g of a microemulsion of perfluoropolyoxyalkylenes previously obtained by mixing:
- 11.8 g of a perfluoropolyoxyalkylene having one end group as an ammonium salified acid of formula:

$$CF_2ClO(CF_2-CF(CF_3)O)_n(CF_2O)_mCF_2COONH_4$$

wherein n/m=10 having average molecular weight 527;
- 6.8 g of a perfluoropolyether oil Galden® D02;
- 19.4 g of water;

1,000 ml of demineralized water;
45 ml of the monomer of formula $CF_2=CF-O-CF_2CF_2-SO_2F$.

The autoclave, stirred at 700 rpm, has been heated up to 50° C. 400 ml of an aqeuous solution having a concentration of 20 g/l of potassium persulphate (KPS) are then fed into the autoclave. The pressure is brought up to 3 absolute atm by introducing TFE. The reaction starts after 10 min. The pressure is maintained at 3 absolute atm by feeding TFE. During the polymerization, 7.5 ml of the sulphonic monomer of formula $CF_2=CF-O-CF_2CF_2-SO_2F$ are added every 6.5 g of fed TFE. The total mass of TFE fed into the reactor is equal to 122 g. The reaction is stopped after 285 min from the start, by slowing down the stirring, cooling the reactor and venting the TFE. The produced latex has a solid content of 30% by weight.

The copolymer composition determined by NMR results to be 68.2% molar of TFE and 31.8% molar of sulphonic monomer, corresponding to an equivalent weight of 494 g/eq. The productivity is equal to 84 g of obtained polymer per hour of polymerization.

Example 3 (Comparative)

In a 2 liter autoclave, the following reactants are introduced:

180 g of a solution at 5% by weight of potassium salified perfluorooctanoate and 95% by weight of water;
600 ml of demineralized water;
45 ml of the monomer of formula $CF_2=CF-O-CF_2CF_2-SO_2F$.

The autoclave, stirred at 700 rpm, has been heated up to 50° C. 400 ml of an aqeuous solution having a concentration of 20 g/l of potassium persulphate (KPS) are then fed into the autoclave. The pressure is brought to 3 absolute atm by introducing TFE. The reaction starts after 20 min. The pressure is maintained at 3 absolute atm by feeding TFE. During the polymerization, 7.5 ml of the sulphonic monomer of formula $CF_2=CF-O-CF_2CF_2-SO_2F$ are added every 6.5 g of fed TFE. The total mass of TFE fed into the reactor is equal to 122 g. The reaction is stopped after 320 min from the start, by slowing down the stirring, cooling the reactor and venting the TFE. The produced latex has a solid content of 18% by weight.

The copolymer composition determined by NMR results to be 70.1% molar of TFE and 29.9% molar of sulphonic monomer, corresponding to an equivalent weight of 515 g/eq. The productivity is equal to 62 g of obtained polymer per hour of polymerization.

TABLE 1

|  | Productivity (g/hour) | Dry product (%) |
|---|---|---|
| Example 1 | 76 | 28 |
| Example 2 | 84 | 30 |
| Example 3 (Comp.) | 62 | 18 |

The latex discharged from the reactor in the case of Examples 1 and 2 does not show any coagulum. In the case of Example 3, the latex shows the presence of coagulum. Therefore, an industrial reactor which operates as in Example 3, requires frequent stops of the reactor for the reactor cleaning. Therefore in a continuous or semi-continuous process the productivity is furtherly reduced.

Example 4

In a 2 liter autoclave, the following reactants are introduced:

51.5 ml (equal to 40 ml/liter of water) of a microemulsion of perfluoropolyoxyalkylenes previously obtained by mixing:
- 11.2 ml of a perfluoropolyoxyalkylene having one acid end group of formula:

$$CF_2ClO(CF_2-CF(CF_3)O)_n(CF_2O)_mCF_2COOH$$

wherein n/m=10 having average molecular weight 600;
- 6.7 ml of a perfluoropolyether oil Galden® D02;
- 6.7 ml of an aqueous solution of $NH_4OH$ at 30% by volume;
- 26.9 ml of water;

1,300 ml of demineralized water;
45 g of the monomer of formula $CF_2=CF-O-CF_2CF_2-SO_2F$.

The autoclave, stirred at 700 rpm, has been heated up to 75° C. 0.13 g of ammonium persulphate are then fed into the autoclave. The pressure is brought up to 11 relative bar by introducing TFE. The reaction starts after 1 min. The pressure is maintained at 11 relative bar by feeding TFE. During the polymerization, 8 g of the sulphonyl monomer of formula $CF_2=CF-O-CF_2CF_2-SO_2F$ are added every 21 g of fed TFE. The total mass of TFE fed into the reactor is equal to 400 g. The reaction is stopped after 160 min from the start, by slowing down the stirring, cooling the reactor and venting the TFE. The produced latex has a solid content of 30% by weight.

The copolymer composition determined by NMR results to be 82.7% molar of TFE and 17.3% molar of sulphonic monomer, corresponding to an equivalent weight of 755 g/eq. The productivity is equal to 187 g of obtained polymer per hour of polymerization.

Example 5

In a 2 liter autoclave, the following reactants are introduced:

32.2 ml (equal to 25 ml/liter of water) of a microemulsion of perfluoropolyoxyalkylenes previously obtained by mixing:
- 7 ml of a perfluoropolyoxyalkylene having one acid end group of formula:

$$CF_2ClO(CF_2-CF(CF_3)O)_n(CF_2O)_mCF_2COOH$$

wherein n/m=10 having average molecular weight 600;

4.2 ml of a perfluoropolyether oil Galden® D02;

4.2 ml of an aqueous solution of NH$_4$OH at 30% by volume;

16.8 ml of water;

1,300 ml of demineralized water;

45 g of the monomer of formula CF$_2$=CF—O—CF$_2$CF$_2$—SO$_2$F;

The autoclave, stirred at 700 rpm, has been heated up to 750C. 0.13 g of ammonium persulphate are then fed into the autoclave. The pressure is brought up to 11 relative bar by introducing TFE. The reaction starts after 1 min. The pressure is maintained at 11 relative bar by feeding TFE. During the polymerization, 8 g of the sulphonic monomer of formula CF$_2$=CF—O—CF$_2$CF$_2$—SO$_2$F are added every 21 g of fed TFE. The total mass of TFE fed into the reactor is equal to 400 g. The reaction is stopped after 155 min from the start, by slowing down the stirring, cooling the reactor and venting the TFE. The produced latex has a solid content of 30% by weight.

The copolymer composition determined by NMR results to be 83.0% molar of TFE and 17.0% molar of sulphonic monomer, corresponding to an equivalent weight of 768 g/eq. The productivity is equal to 193 g of obtained polymer per hour of polymerization.

Example 6 (Comparative)

In a 2 liter autoclave, the following reactants are introduced:

19.3 ml (equal to 15 ml/liter of water) of a microemulsion of perfluoropolyoxyalkylenes previously obtained by mixing:

4.2 ml of a perfluoropolyoxyalkylene having one acid end group of formula:

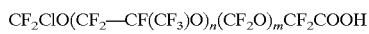

CF$_2$ClO(CF$_2$—CF(CF$_3$)O)$_n$(CF$_2$O)$_m$CF$_2$COOH wherein n/m=10 having average molecular weight 600;

2.5 ml of a perfluoropolyether oil Galden® D02;

2.5 ml of an aqueous solution of NH$_4$OH at 30% by volume;

10.1 ml of water;

1,300 ml of demineralized water;

45 g of the monomer of formula CF$_2$=CF—O—CF$_2$CF$_2$—SO$_2$F.

The autoclave, stirred at 700 rpm, has been heated up to 75° C. 0.13 g of ammonium persulphate are then fed into the autoclave. The pressure is brought up to 11 relative bar by introducing TFE. The reaction starts after 1 min. The pressure is maintained at 11 relative bar by feeding TFE. During the polymerization, 8 g of the sulphonic monomer of formula CF$_2$=CF—O—CF$_2$CF$_2$—SO$_2$F are added every 21 g of fed TFE. The total mass of TFE fed into the reactor is equal to 400 g. The reaction is stopped after 210 min from the start, by slowing down the stirring, cooling the reactor and venting the TFE. The produced latex has a solid content of 30% by weight.

The copolymer composition determined by NMR results to be 82.9% molar of TFE and 17.1% molar of sulphonic monomer, corresponding to an equivalent weight of 764 g/eq. The productivity is equal to 143 g of polymer obtained per hour of polymerization.

TABLE 2

| | Microemulsion amount (ml/l) | Productivity (g/hour) |
|---|---|---|
| Example 4 | 40 | 187 |
| Exampre 5 | 25 | 193 |
| Example (Comp.) | 15 | 143 |

The latex discharged from the reactor in the case of Examples 4 and 5 does not show any coagulum. In the case of Example 6, the latex shows the presence of coagulum. Therefore, an industrial reactor which operates as in Example 6, requires frequent stops of the reactor for the reactor cleaning. Therefore in a continuous or semi-continuous process the productivity is furtherly reduced.

Example 7

In a 5 liter autoclave, the following reactants are introduced:

120 ml (equal to 40 ml/liter of water) of a microemulsion of perfluoropolyoxyalkylenes previously obtained by mixing:

26.2 ml of a perfluoropolyoxyalkylene having one acid end group of formula:

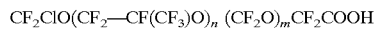

CF$_2$ClO(CF$_2$—CF(CF$_3$)O)$_n$ (CF$_2$O)$_m$CF$_2$COOH wherein n/m=10 having average molecular weight 600;

15.7 ml of a perfluoropolyether oil Galden® D02;

15.7 ml of an aqueous solution of NH$_4$OH at 30% by volume;

62.4 ml of water;

the so obtained microemulsion results to have pH=4.5;

3,000 ml of demineralized water;

112 g of the monomer of formula CF$_2$=CF—O—CF$_2$CF$_2$—SO$_2$F.

The autoclave, stirred at 630 rpm, has been heated up to 75° C. 0.6 g of ammonium persulphate are then fed into the autoclave. The pressure is brought up to 11 relative bar by introducing TFE. The reaction starts after 1 min. The pressure is maintained at 11 relative bar by feeding TFE. During the polymerization, 20 g of the sulphonic monomer of formula CF$_2$=CF—O—CF$_2$CF$_2$—SO$_2$F are added every 52.5 g of fed TFE. The total mass of TFE fed into the reactor is equal to 1,000 g. The reaction is stopped after 79 min from the start, by slowing down the stirring, cooling the reactor and venting the TFE. The produced latex has a solid content of 30% by weight.

The copolymer composition determined by NMR results to be 82.7% molar of TFE and 17.3% molar of sulphonic monomer, corresponding to an equivalent weight of 755 g/eq. The productivity is equal to 911 g of polymer obtained per hour of polymerization.

The latex has been cold coagulated, centrifuged and the mother liquors have been analyzed by ionic chromatography for determining the content of metal ions coming from the autoclave corrosion. The results are shown in Table 3.

Example 8

In a 5 liter autoclave, the following reactants are introduced:

120 ml (equal to 40 ml/liter of water) of a microemulsion of perfluoropolyoxyalkylenes previously obtained by mixing:

26.2 ml of a perfluoropolyoxyalkylene having one acid end group of formula:

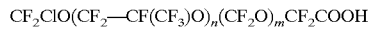

CF$_2$ClO(CF$_2$—CF(CF$_3$)O)$_n$(CF$_2$O)$_m$CF$_2$COOH wherein n/m=10 having average molecular weight 600;

15.7 ml of a perfluoropolyether oil Galden® D02;

16.2 ml of an aqueous solution of $NH_4OH$ at 30% by volume;

60.7 ml of water;

the so obtained microemulsion results to have pH=6.2;

3,000 ml of demineralized water;

112 g of the monomer of formula $CF_2=CF-O-CF_2CF_2-SO_2F$.

The autoclave, stirred at 630 rpm, has been heated up to 75° C. 6 g of ammonium persulphate are then fed into the autoclave. The pressure is brought up to 11 relative bar by introducing TFE. The reaction starts after 1 min. The pressure is maintained at 11 relative bar by feeding TFE. During the polymerization, 20 g of the sulphonic monomer of formula $CF_2=CF-O-CF_2CF_2-SO_2F$ are added every 52.5 g of fed TFE. The total mass of TFE fed into the reactor is equal to 1,000 g. The reaction is stopped after 78 min from the start, by slowing down the stirring, cooling the reactor and venting the TFE. The produced latex has a solid content of 30% by weight.

The copolymer composition determined by NMR results to be 82.6% molar of TFE and 17.4% molar of sulphonic monomer, corresponding to an equivalent weight of 748 g/eq. The productivity is equal to 923 g of polymer obtained per hour of polymerization.

The latex has been cold coagulated, centrifuged and the mother liquors have been analyzed by ionic chromatography for determining the content of metal ions due to the autoclave corrosion. The results are shown in Table 3.

Example 9 (Comparative)

In a 5 liter autoclave, the following reactants are introduced:

120 ml (equal to 40 ml/liter of water) of a microemulsion of perfluoropolyoxyalkylenes previously obtained by mixing:

26 ml of a perfluoropolyoxyalkylene having one acid end group of formula:

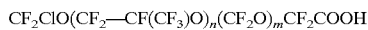

$CF_2ClO(CF_2-CF(CF_3)O)_n(CF_2O)_mCF_2COOH$ wherein n/m=10 having average molecular weight 600;

15.6 ml of a perfluoropolyether oil Galden® D02;

26 ml of an aqueous solution of $NH_4OH$ at 30% by volume;

52.4 ml of water;

the so obtained microemulsion results to have pH=9;

3,000 ml of demineralized water;

112 g of the monomer of formula $CF_2=CF-O-CF_2CF_2-SO_2F$.

The autoclave, stirred at 630 rpm, has been heated up to 75° C. 0.6 g of ammonium persulphate are then fed into the autoclave. The pressure is brought up to 11 relative bar by introducing TFE. The reaction starts after 1 min. The pressure is maintained at 11 relative bar by feeding TFE. During the polymerization, 20 g of the sulphonic monomer of formula $CF_2=CF-O-CF_2CF_2-SO_2F$ are added every 52.5 g of fed TFE. The total mass of TFE fed into the reactor is equal to 1,000 g. The reaction is stopped after 79 min from the start, by slowing down the stirring, cooling the reactor and venting the TFE. The produced latex has a solid content of 30% by weight.

The copolymer composition determined by NMR results to be 82.5% molar of TFE and 17.5% molar of sulphonic monomer, corresponding to an equivalent weight of 750 g/eq. The productivity is equal to 911 g of polymer obtained per hour of polymerization.

The latex has been cold coagulated, centrifuged and the mother liquors have been analyzed by ionic chromatography for determining the content of metal ions due to the autoclave corrosion. The results are shown in Table 3.

TABLE 3

|  | pH microemulsion | Fe ions (mg/l) | Cr ions (mg/l) | Ni ions (mg/l) |
|---|---|---|---|---|
| Example 7 | 4.5 | 5 | 1 | <0.5 |
| Example 8 | 6.2 | 6 | 1 | <0.5 |
| Example 9 (Comp.) | 9 | 16 | 3 | 0.5 |

What is claimed is:

1. A process for polymerizing
   (I) one or more fluorinated monomers containing at least one ethylene unsaturation;
   (II) one or more fluorinated monomers containing sulphonyl groups $-SO_2F$; said process comprising the following steps:
   a) preparing a perfluoropolyether (PFPE) aqueous microemulsion with a pH in a range between 4 and 7, having end groups selected from groups of non reactive groups and groups with one or more H, Cl atoms to replace fluorine;
   b) feeding into a reactor an amount of said microemulsion greater than 18 ml per liter of reaction medium;
   c) degassing the reactor, feeding into the reactor said monomer (II) as a liquid, taking up reactor pressure by feeding into the reactor gaseous monomers (I);
   d) adding an initiator and, during the polymerization, feeding into the reactor said monomers (I) to maintain reactor pressure.

2. A process according to claim 1, wherein the fluorinated monomers of type (I) are selected from:
   vinylidene fluoride (VDF);
   $C_2-C_8$ perfluoroolefins;
   $C_2-C_8$ chloro- and/or bromo- and/or iodo-fluoroolefins;
   $CF_2 \alpha CFOR_f$ (per)fluoroalkylvinylethers (PAVE), wherein $R_f$ is a $C_1-C_6$ (per)fluoroalkyl;
   $CF_2=CFOX$ perfluoro-oxyalkylvinylethers, wherein X is a $C_1-C_{12}$ perfluoro-oxyaklyl having one or more ether groups.

3. A process according to claim 1, wherein the fluorinated monomers of type (II) are selected from:
   $F_2C=CF-O-CF_2-CF_2-SO_2F$;
   $F_2C=C-F-O-[CF_2-CXF-O]n-CF_2-CF_2-SO_2F$
   wherein X=Cl, F or $CF_3$; n=1–10;
   $F_2C=CF-O-CF_2-CF_2-CF_2-SO_2F$;
   $F_2C=CF-Ar-SO_2F$.

4. A process according to claim 1, wherein besides the monomers of type (I) and (II), bis-olefins of formula:

$R_1R_2C=CH-(CF_2)_m-CH=CR_5R_6$ (III)

wherein m=2–10, preferably 4–8, $R_1$, $R_2$, $R_5$, $R_6$, equal to or different from each other, are H or $C_1-C_5$ alkyl groups, can be used as comonomers, in an amount in the range 0.01–5% by moles.

5. A process according to claim 1, wherein as comonomers are used:

tetrafluoroethylene;

$CF_2=CF-O-CF_2CF_2SO_2F$;

bis-olefin of formula (III), wherein $R_1$, $R_2$, $R_5$, $R_6$ are H and m=6 or 8.

6. A process according to claim 1, wherein brominated and/or iodinated cure-site comonomers and/or iodinated and/or brominated chain transfer agents are used.

7. A process according to claim 1, wherein the aqueous microemulsion comprises:

a (per) fluoropolyether oil phase of formula:

wherein n/m=20 having average molecular weight in the range 400–600;

a fluorinated surfactant agent of formula:

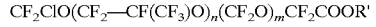

wherein R'=Na, K, $NH_4$, n/m=10 having average molecular weight in the range 500–700.

8. A process as claimed in claim 1, wherein the amount of said microemulsion fed into the reactor is in the range between 25 ml and 50 ml per liter of reaction medium.

9. A process as claimed in claim 1, wherein at step d), a further amount of monomer (II) and transfer agents is added.

* * * * *